H. W. HILL.
Improvement in Hog-Traps.

No. 127,769. 　　　　　　　　　Patented June 11, 1872.

WITNESSES:
John Gross
Robert R. Montgomery

INVENTOR:
HUGH W. HILL,
per Chas. P. Housum
HIS ATTORNEY.

AM. PHOTO-LITHOGRAPHIC CO. N.Y. (OSBORNE'S PROCESS.)

UNITED STATES PATENT OFFICE.

HUGH W. HILL, OF FORSYTHE, ILLINOIS.

IMPROVEMENT IN HOG-TRAPS.

Specification forming part of Letters Patent No. 127,769, dated June 11, 1872.

Specification describing certain Improvements in Hog-Holders, invented by HUGH W. HILL, of Forsythe, in the county of Macon and State of Illinois.

My invention relates to an improvement in a device for holding hogs for the purpose of wiring, ringing, or snouting; and consists in a movable platform, operated with a windlass or other equivalent device, in combination with a suitable pen, with a sliding gate at the end thereof, and one on the rear end of the platform, as is more fully described.

Figure 1:
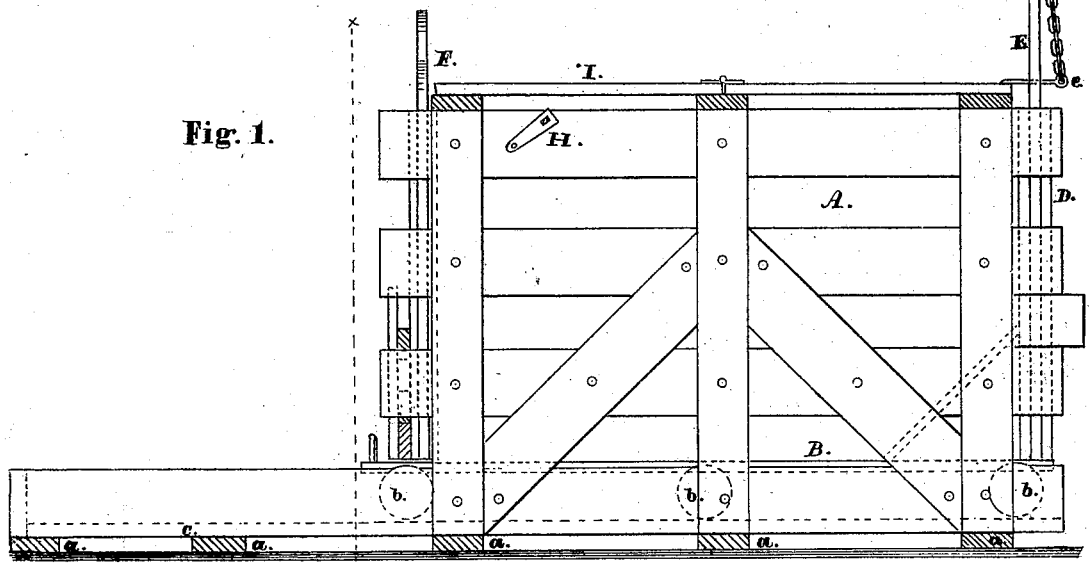
Figure 2:
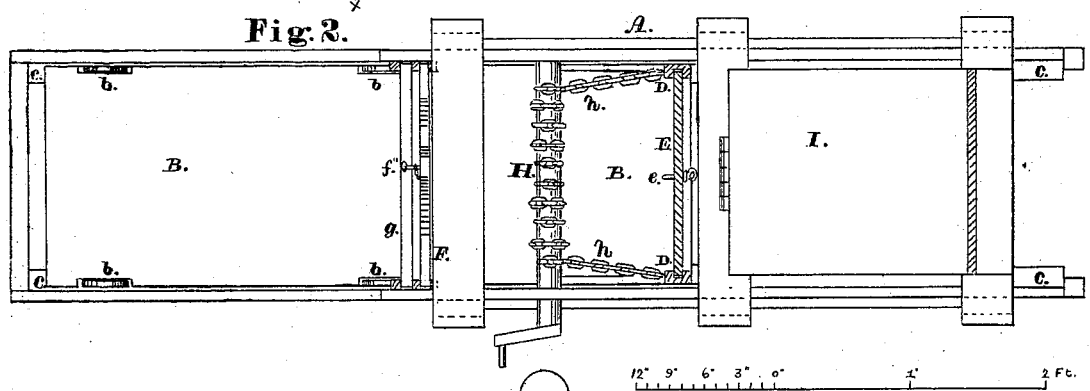
Figure 3:
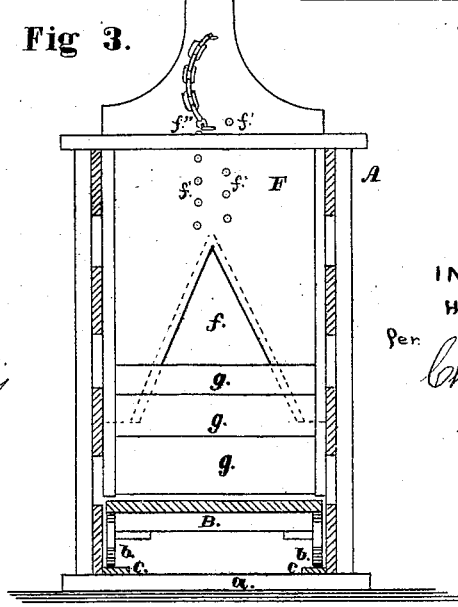

Figure 1 is a side elevation of a pen for holding hogs, and embodies my invention. Fig. 2 is a plan of the same; and Fig. 3, a vertical transverse section taken through the dotted lines $x$ $x$, Fig. 1.

A is the pen. B is a movable platform on the wheels $b$ $b$, which run on longitudinal slats $c$ $c$ placed upon the transverse pieces $a$ $a$ of the pen. At the rear end of this platform are erected two slotted posts, D D, in which slides the gate E. At the front of the pen is another gate, F, with the opening $f$. This gate slides in slats attached to the pen. In front of this gate is another groove, in which are placed the boards $g$ $g$. H is a windlass, to which and the posts D D are attached chains or ropes $h$ $h$. I is a hinged covering to the pen.

The device is operated as follows—viz.: The gate E is raised and secured with the pin $e$, as shown in Fig. 1, and the hog driven on the platform B; the gate is then closed, and, by means of the windlass H, the platform and the hog are moved forward until the animal's head is through the opening $f$ in the gate F, and the hog is secured; (this position of the platform, &c., is shown in Fig. 2.) The gate F can be raised and lowered, and secured with the pin $f$, so that the hog cannot raise it. The boards $g$ $g$ in front of the gate are so arranged that one or more can be taken out or replaced for different sizes of hogs, it being an object that the snout of the hog shall be raised up for the purpose of ringing, wiring, or snouting it. After the operation is performed the gate F is raised and the animal released, when the platform can be run back.

I claim as my invention—

The movable platform B, operated with the windlass H or other equivalent device, and the gates E and F, in combination with the pen A, constructed substantially as described, and for the purpose set forth.

HUGH W. HILL.

Witnesses:
CHARLES P. HOUSUM,
JACOB I. BEAR.